(12) United States Patent
Kich et al.

(10) Patent No.: US 6,201,949 B1
(45) Date of Patent: Mar. 13, 2001

(54) MULTIPLEXER/DEMULTIPLEXER STRUCTURES AND METHODS

(76) Inventors: Rolf Kich, 1624 Harper Ave., Redondo Beach, CA (US) 90278; Devon J. Gray, 2604 W. 176th St., Torrance, CA (US) 90504

( * ) Notice: Subject to any disclaimer, the term of this patent is extended or adjusted under 35 U.S.C. 154(b) by 0 days.

(21) Appl. No.: 09/083,456
(22) Filed: May 22, 1998
(51) Int. Cl.7 .............................. H04H 1/59; H01P 1/213
(52) U.S. Cl. .................. 455/12.1; 455/13.1; 370/316; 370/319; 333/126; 333/135
(58) Field of Search ................. 333/126, 129, 333/135; 455/13.1, 13.3, 12.1; 370/281, 295, 316, 319

(56) References Cited

U.S. PATENT DOCUMENTS

| | | | |
|---|---|---|---|
| 4,777,459 | * 10/1988 | Hudspeth | 333/135 |
| 5,254,963 | * 10/1993 | Bonetti et al. | 333/135 X |
| 5,546,057 | * 8/1996 | Pfitzenmaier | 333/135 X |

FOREIGN PATENT DOCUMENTS

1160488 * 6/1985 (SU) ................................. 333/135

* cited by examiner

Primary Examiner—Benny Lee
(74) Attorney, Agent, or Firm—Terje Gudmestad; Michael W. Sales (57) ABSTRACT

A multiplexer/demultiplexer structure is provided which multiplexes multiple channel signals through a common tee of a tee/manifold mulitplexer arrangement. This multiplexing significantly reduces the number of tees required for a given number of multiplexed channels. Accordingly, mulitplexer/demulitplexer design time is reduced and fabricated multiplexers/demultiplexers are lighter, smaller and less expensive. The tee multiplexing is facilitated with multiple access apertures that are isolated by a septum. The septum forms reduced-height waveguides which define a path length between apertures that is sufficient to significantly reduce higher-order modes and, therefore, apeture interactions.

24 Claims, 5 Drawing Sheets

MULTIPLEXER/DEMULTIPLEXER STRUCTURES AND METHODS

BACKGROUND OF THE INVENTION

1. Field of the Invention

The present invention relates generally to waveguide structures and more particularly to waveguide multiplexers/demultiplexers.

2. Description of the Related Art

Frequency-division multiplexing is the process of transmitting a plurality of input signals over a common transmission path by assigning a different frequency channel for each signal. Thus, the combined signals can subsequently be separated by filtering and by providing separate transmission paths for the filtered signals. The filtering and providing processes are those of frequency-division demultiplexing. Because demultiplexing is the inverse function of multiplexing, the following discussion is restricted, for simplicity, to multiplexing.

Low-loss, high-power frequency-division multiplexing in the microwave region is facilitated by the use of waveguide multiplexers which typically form a plurality of input ports for the reception of microwave input channel signals and a single output port for delivery of the multiplexed signals onto a common transmission path. Generally, this path leads to common signal-processing structures, e.g., a microwave amplifier or a radiating antenna.

In conventional waveguide multiplexers, a plurality of input waveguides (typically referred to as tee's) are joined to a single output waveguide (typically referred to as a manifold) in a way that enhances electromagnetic signal transfer. For example, each tee is arranged to form an E-plane junction with the manifold in one exemplary multiplexer structure and an H-plane junction in another. In most multiplexer waveguide structures, the manifold has an open-circuited end for transmission of the multiplexed input signals. Opposite the open-circuited end, the manifold has a short-circuited end and the tees are spaced by selected distances from the shorted end. Each tee also terminates in a short-circuited end and forms an aperture in this short-circuited end for signal access to that tee. A waveguide filter is coupled to the aperture so that channel filtering is associated with signal transmission through the tee.

In practice, a number of problems complicate multiplexer design. First, each input signal travels down its respective tee and splits into two signals which propagate in opposite directions along the manifold. One signal propagates towards the manifold's open-circuited end and the other propagates to, and is reflected from, the manifold's short-circuited end. Tee and manifold distances must therefore be carefully chosen so that each reflected signal from the manifold's short-circuited end adds to signals entering the manifold from that reflected signal's respective tee, i.e., these signals must be substantially in phase when they meet.

Secondly, the reflected signals from the manifold's short-circuited end again split as they successively reach each tee, with one signal portion propagating down the manifold and the other portion propagating up that tee and being reflected from that tee's short-circuited end. Tee and manifold distances must also be chosen so that signals reflected from tee shorted ends arrive in phase with signals entering the manifold from that reflected signal's respective tee.

Because they lie in different frequency channels, each of the input signals propagates with a different guide wavelength $\lambda g$. A successful multiplexer design must therefore take the different propagation wavelengths into account and realize a dimensional layout that enhances signal additions at each tee so as to enhance the transmitted channel energy at the manifold's open-circuited end.

Multiplexer design is further complicated by impedance mismatches at the junctions of the tees and the manifold which generate additional signal reflections. An acceptable multiplexer design must reduce these impedance mismatches as much as possible and yet accommodate the reflected signals from the remaining mismatches.

Impedance mismatches can result in an apparent electrical short circuit wall at a specific frequency. A manifold resonance can be created between this apparent electrical wall and the manifold's short-circuited end or any one of the tee short-circuited ends. These types of resonances further degrade multiplexer performance.

In addition, multiplexer transmission-line discontinuities (e.g., tee-manifold junctions) generate higher-order electromagnetic modes. Because multiplexers are generally associated with nonlinear processes (e.g., high-power amplification), the input signals typically include frequency harmonics and this combination of discontinuities and harmonics generates higher-order harmonic modes which propagate in the multiplexer with different guide wavelengths. At other discontinuities (e.g., downstream waveguide junctions), energy is exchanged between these propagating modes. A successful multiplexer design must also control the energy exchanges of propagating higher-order modes in order to enhance the transmitted channel energy.

These complications of multiplexer design generally increase exponentially with each additional frequency channel that is included in the multiplexer. It has been found, for example, that although a satisfactory design can be found relatively quickly for an eight channel waveguide multiplexer, a satisfactory design for a sixteen channel multiplexer is exceedingly difficult to obtain.

SUMMARY OF THE INVENTION

The present invention is directed to multiplexer/demultiplexer structures and methods which facilitate simpler and less expensive design solutions than are conventionally available. In particular, structures and methods of the invention reduce the number of tees that are required for a given number of multiplexer channels. Multiplexer/demultiplexer designs which conventionally would have been complex and expensive are thus transformed into simpler, lighter, smaller and less expensive designs. Because the number of junctions are reduced, multiplexer/demultiplexer structures of the invention also exhibit improved performance.

These goals are realized with a primary waveguide and at least one secondary waveguide which is joined to the primary waveguide and which forms at least first and second apertures for signal access to the secondary waveguide. A plurality of waveguide filters are multiplexed to each secondary waveguide by coupling each through a respective one of the apertures. Signal isolation is obtained with a septum that is positioned between each adjacent pair of apertures.

The septum is preferably dimensioned to create an aperture-to-aperture transmission path that is sufficiently long (e.g., greater than $(\frac{1}{4})\lambda_{g_{avg}}$) to significantly reduce higher-order modes and, therefore, aperture interactions.

Different embodiments of the invention can be formed with various waveguide configurations (e.g., circular, rectangular or dielectric) and with different tee-manifold junctions (e.g., E-plane and H-plane junctions).

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
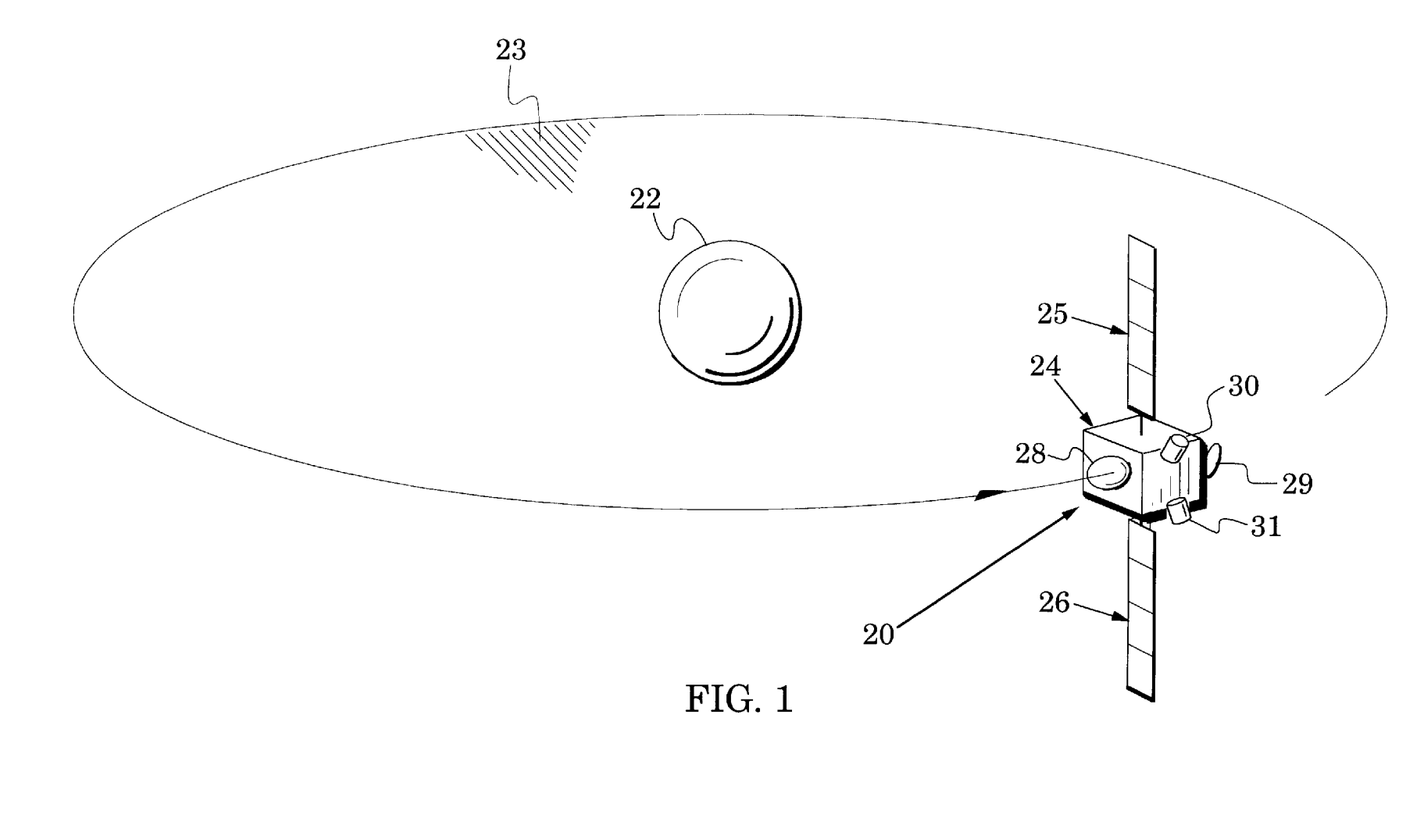
FIG. 1 illustrates a communication spacecraft in an orbital plane about the Earth.
Figure 2:
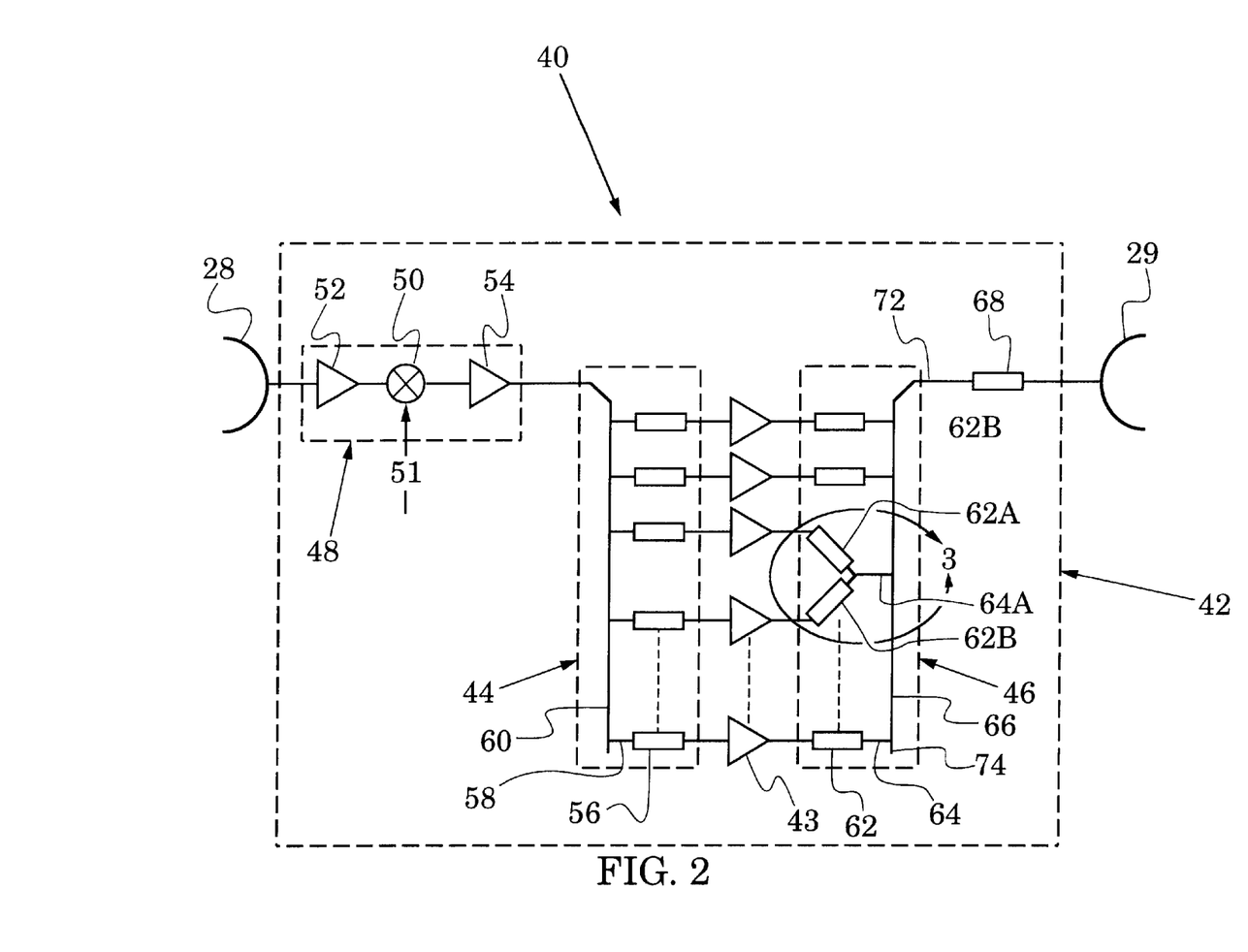
FIG. 2 is a block diagram of a transponder in the spacecraft of FIG. 2 wherein the transponder includes a demultiplexer and a multiplexer.
Figure 3:
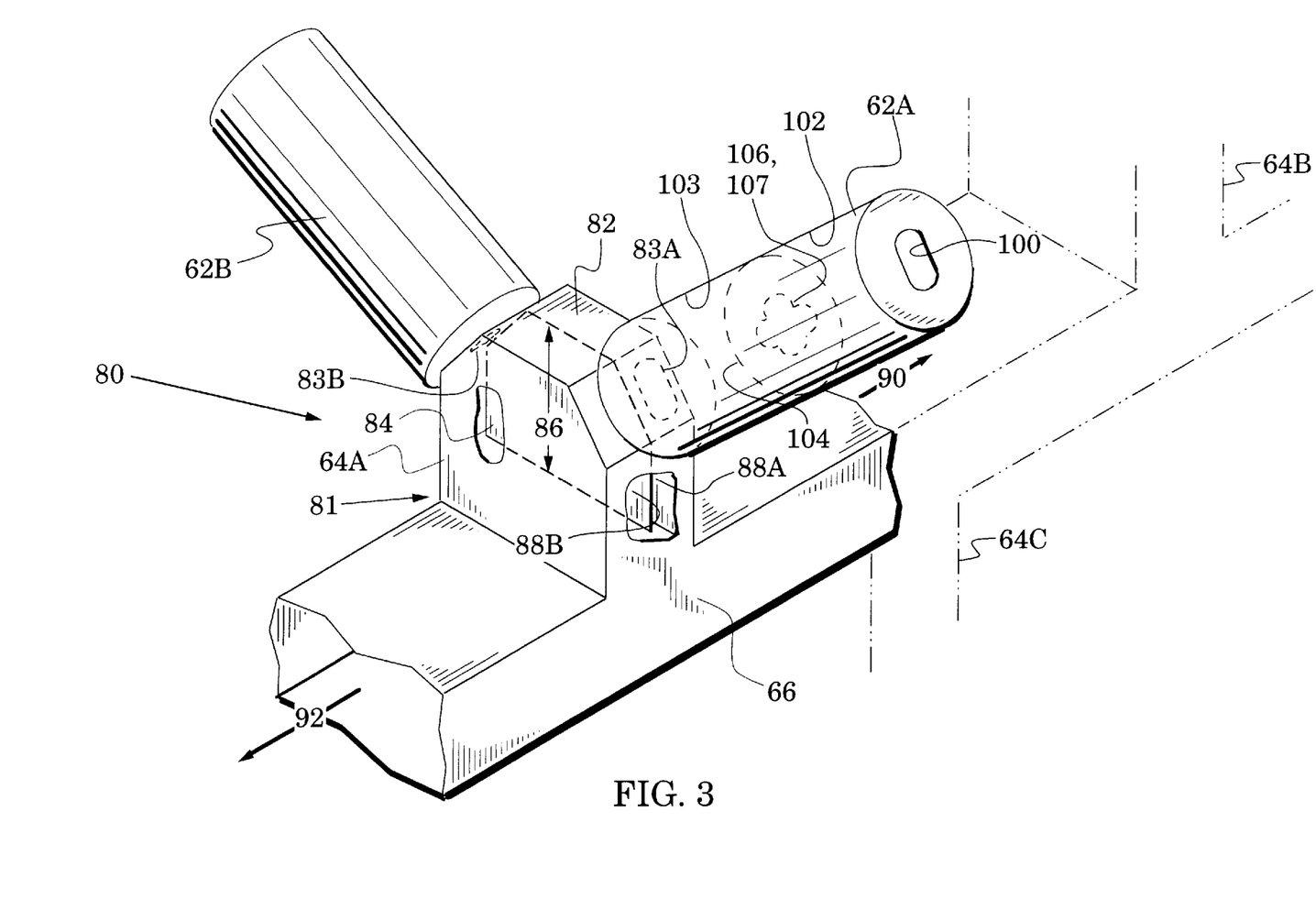
FIG. 3 is an enlarged, perspective view of multiplexer structure of the present invention that is included within the curved line 3 of FIG. 2.
Figure 4:
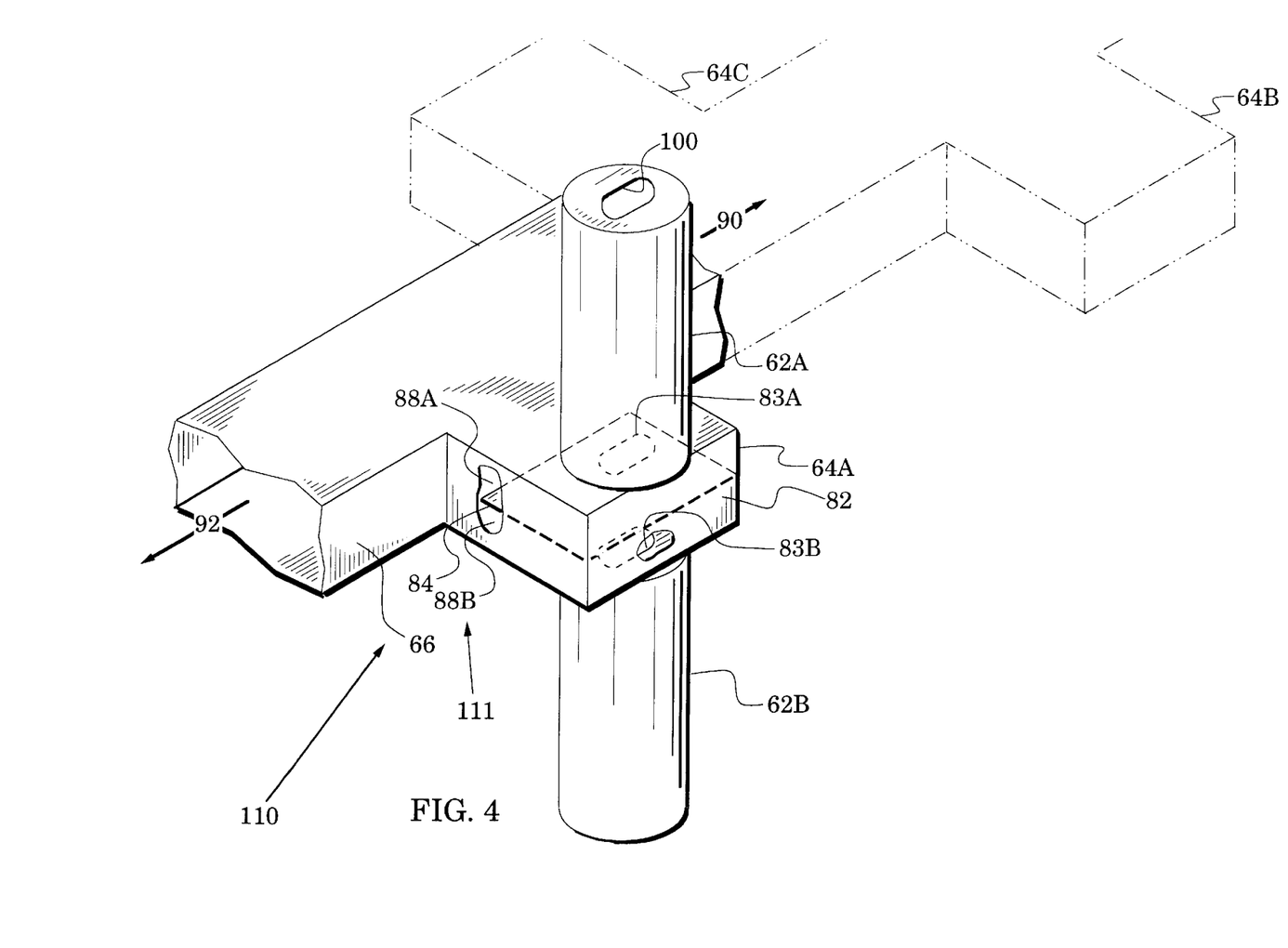
FIG. 4 is view similar to FIG. 3 which illustrates another multiplexer structure of the present invention.
Figures 5, 6:
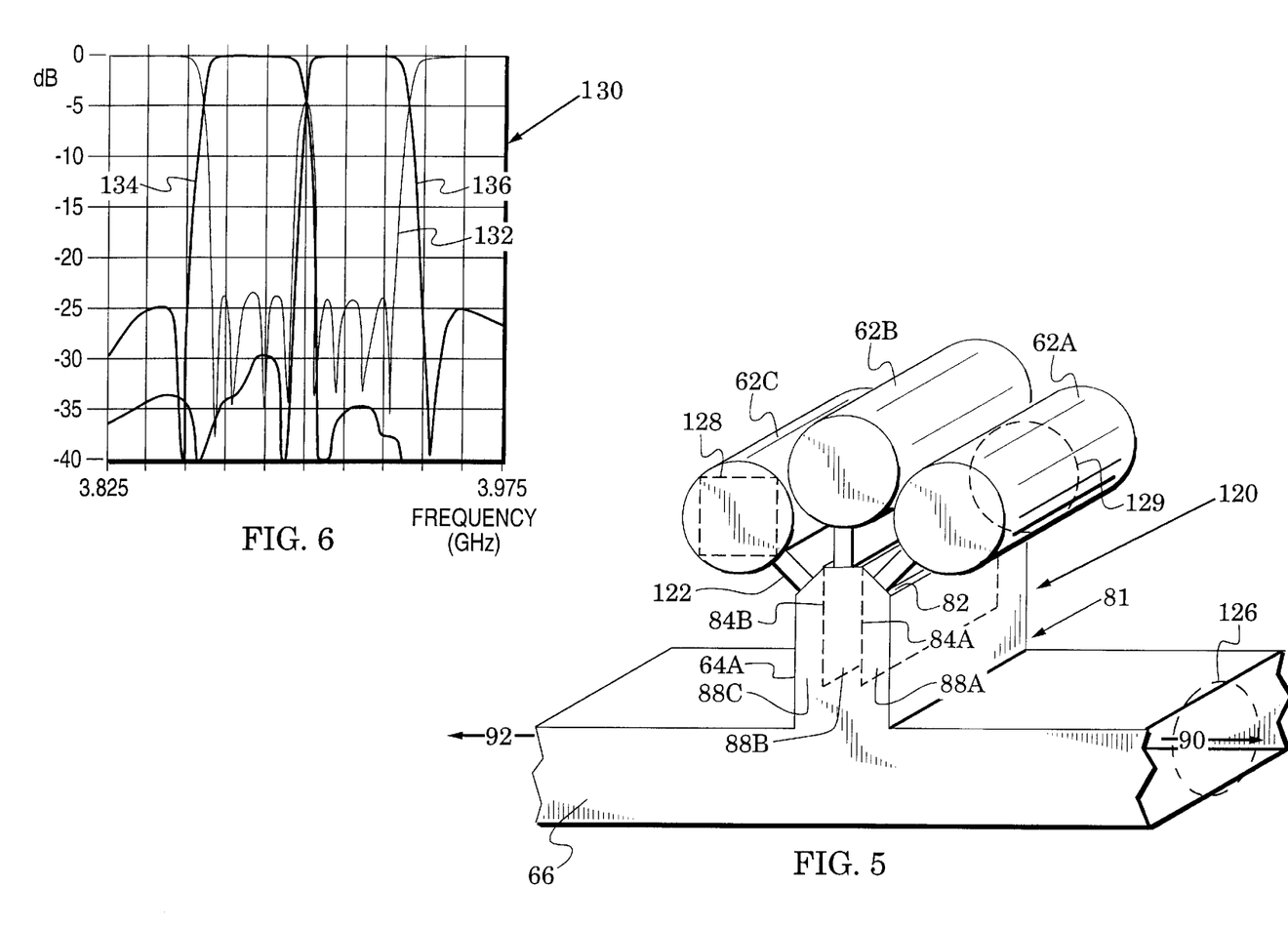
FIG. 5 is a perspective view of another multiplexer structure of the present invention.
FIG. 6 is a graph of measured transmission and reflection characteristics in a prototype of the multiplexer structure of FIG. 3.

FIGS. 3, 4 and 5 illustrate multiplexer/demultiplexer embodiments of the present invention and FIGS. 1 and 2 illustrate an exemplary use of the invention. For descriptive simplicity, the multiplexer/demultiplexer embodiments will be described principally from a multiplexer perspective.

The multiplexer structures exemplified by FIGS. 3, 4 and 5 employ signal-isolating septums which reduce signal interactions and facilitate the multiplexing of multiple input signals through a single tee. Accordingly, the number of tee's required for a given number of multiplexer channels can be significantly reduced with consequent lowering of the complexity and cost of multiplexer designs and the size, weight and cost of fabricated multiplexers. In multiplexers with a large number of frequency channels (e.g., $\geq 16$), tee reductions of the invention may even enable the realization of an otherwise unrealizable multiplexer. To enhance its clarity, a description of multiplexer structures of FIGS. 3, 4 and 5 is preceded by the following description of FIGS. 1 and 2.

As shown in FIG. 1, a spacecraft communication system is carried by a spacecraft 20 (e.g., a body-stabilized or spinner spacecraft) which orbits a celestial body such as the Earth 22 in an orbital plane 23. The spacecraft 20 includes a body 24 which carries a pair of solar wings 25 and 26 to receive solar radiation and convert it into electrical energy for operation of the spacecraft's systems. The spacecraft body 24 also carries receive and transmit antennas 28 and 29 for communication with Earth-based communication stations. Typically, the spacecraft 20 also carries systems (e.g., thrusters 30 and 31) for maintaining the spacecraft's assigned orbital station and for maintaining a spacecraft attitude that enhances signal exchange between the spacecraft and the communication stations.

As shown in FIG. 2, a frequency converter/amplifier 42 is coupled between the receive and transmit antennas 28 and 29 to form a transponder system 40. The converter/amplifier 42 has a plurality of amplifiers 43 arranged between a demultiplexer 44 and a multiplexer 46. This structure is fed by a frequency conversion subsection 48 in which a mixer 50 and a local oscillator signal 51 are used to frequency convert the output of a low-noise amplifier 52. The frequency conversion subsection 48 may also include preamplifiers 54 at the converted channel frequencies. The low-noise amplifier 52 is coupled to the receive antenna 28.

Each of the amplifiers 43 is dedicated to a respective frequency channel of the transponder 40. In the demultiplexer 44, channel bandpass filters 56 are coupled through secondary waveguides in the form of tees 58 to a primary waveguide in the form of a manifold 60 which connects to the subsection 48. Each of the channel filters 56 is connected to a respective one of the amplifiers 43. Similarly, channel bandpass filters 62 are coupled through tees 64 to a manifold 66 of the multiplexer 46. Each of the channel filters 62 is connected to a respective one of the amplifiers 43 and the manifold 66 couples to the transmit antenna 29 through output filters 68. The output filters 68 are configured to reduce harmonics and higher-order electromagnetic modes which would otherwise degrade the radiating performance of the output antenna 29.

In its operation, the transponder 40 receives input communication signals in a receive frequency band through the receive antenna 28, converts the received signals to a transmit frequency band, amplifies the frequency-converted channel signals and retransmits the converted and amplified signals through the transmit antenna 29. In an exemplary communications system, the transponder's receive antenna 28 might be configured and oriented to receive signals from a single Earth-based station and the transponder's transmit antenna 29 might be configured and oriented to transmit signals to an area of the Earth for reception by a plurality of Earth-based stations.

The manifold 66 of the multiplexer 46 has an open-circuited end 72 which couples the combined signal channels to the output filters 68 and output antenna 29. Opposite the open-circuited end 72, the manifold 66 has a short-circuited end 74. The tees 64 are spaced from the short-circuited end 74 by distances which are selected to enhance signal addition between channel signals exiting the tees and channel signals which are generated by various reflection generators (e.g., tee and manifold short-circuited ends and waveguide impedance mismatches).

The microwave amplifiers 43 are typically high-power microwave amplifiers (e.g., traveling-wave tubes) which generate frequency harmonics because their amplification is a nonlinear process. In addition, signals passing through the transponder 40 typically encounter transmission-line discontinuities (e.g., waveguide bends and junctions) which generate higher-order electromagnetic modes.

This combination of frequency harmonics and transmission-line discontinuities gives rise to manifold resonances and propagating higher-order modes whose energy exchanges at other transmission-line discontinuities further complicate multiplexer design. As stated above, these complications cause conventional multiplexer designs for high numbers of channels to be exceedingly complex and expensive. Although these multiplexer problems have been described with reference to spacecraft, they occur in many other communcation structures (e.g., communication ground stations).

Accordingly, an embodiment 80 of the multiplexer 40 includes the structure of FIG. 3 which shows the manifold 66 and one of the tees 64A forming an E-plane junction 81. In contrast to conventional multiplexer structures, a pair 62A and 62B of the channel filters of FIG. 2 are coupled to a short-circuited end 82 of the tee 64A. The shorted end forms first and second apertures 83A and 83B for signal access to the tee 64A and the filters 62A and 62B are respectively coupled through the apertures 83A and 83B to the interior of the tee. A septum 84 extends away from the short-circuited end 82 and is positioned between the apertures 83A and 83B to provide signal isolation. The short-circuited end 82 can be configured in various ways that provide physical clearance between the filters 62A and 62B. In FIG. 3, for example, opposite corners of the shorted end 82 are chamfered to angle the filters away from each other.

In one multiplexer embodiment, the septum has a length 86 of $(1/4)\lambda_{g_{avg}}$ in which $\lambda_{g_{avg}}$ is the average guide wavelength of channel signals that are processed through the tee 64A. Thus, the septum 84 defines two subwaveguides in the form of reduced-height waveguides 88A and 88B which extend away from the short-circuited end 82. Each of these waveguides forms a quarter-wave impedance transformer and, for signals having a guide wavelength substantially equal to $\lambda_{g_{avg}}$, these impedance transformers transform the short-circuited end 82 into an apparent open circuit (i.e., a very large impedance) at the opposite end of the septum 84.

In operation of this multiplexer embodiment, a channel signal is filtered through the filter 62A and coupled through the aperture 83A to then propagate down the reduced-height waveguide 88A. As this channel signal reaches the end of the reduced-height waveguide 88A, it "sees" the signal open-circuited that is presented by the quarter-wave transformer action of the reduced-height waveguide 88B. Thus, the channel signal is inhibited from propagating into the latter waveguide and, instead, propagates down the remainder of the tee 64A and into the manifold 66 where one signal portion 90 propagates towards the manifold's open-circuited end and another signal portion 92 propagates towards the manifold's short-circuited end (this propagation mode may be, for example, a $TE_{10}$ mode). A different channel signal filtered through the filter 62B propagates in a similar series of processes so that both signals are multiplexed through the same tee.

As stated above, a combination of frequency harmonics and transmission-line discontinuities gives rise to manifold resonances and propagating higher-order modes. The septum 84 is preferably dimensioned to create a transmission path from aperture to aperture (e.g., from aperture 83A to aperture 83B) that is sufficiently long that it significantly reduces the higher-order modes. Because the majority of higher order modes die out within $(1/4)\lambda_{g_{avg}}$, a transmission path length which exceeds $(1/4)\lambda_{g_{avg}}$ (i.e., a septum length which exceeds $(1/8)\lambda_{g_{avg}}$) will greatly reduce the higher-order modes and reduce apeture interactions.

The teachings of the invention can be practiced with various conventional configurations of microwave channel filters. For example, the filters 62A and 62B are shown to each form a cylindrical cavity in which one transverse end wall forms a signal-entrance aperture 100. As shown for filter 62A, this main cavity is divided into two cylindrical cavities 102 and 103 by a transverse septum 104 which forms two orthogonally-arranged apertures 106 and 107. Filters of this type support the existence of two different modes (e.g., $TE_{11x}$ modes) which are coupled between the two cavities to realize a four resonator quasi-elliptic passband in a relatively small, lightweight filter. Other conventional microwave filters formed in various waveguides (e.g., rectangular or circular) to form various passband shapes (e.g., Chebyshev or quasi-elliptic) can be used to form equivalent multiplexer embodiments.

Other tees can be junctioned with the manifold 66 to each carry multiple channel signals in a manner similar to that of the tee 64A. As indicated in FIG. 3, these tees may extend from the same broad wall of the manifold as the tee 64A (e.g., the tee 64B) or from an opposite broad wall (e.g., the tee 64C).

Another multiplexer embodiment 110 is shown in FIG. 4 which is similar to FIG. 3 with like elements indicated by like reference numbers. In contrast to the embodiment 80 of FIG. 3, the tee 64A and the manifold 66 are now arranged to form an H-plane junction 111 (other tees 64B and 64C are similarly arranged). Also the short-circuited end 82 need not be modified (i.e., chamfered as in FIG. 3) because the tee apertures 83A and 83B are now positioned in opposite broad walls of the reduced-height waveguides 84A and 84B.

The H-plane junction arrangement of FIG. 4 facilitates this different aperture arrangement in which electric field vectors can exit the apertures 83A and 83B to be arranged across the narrow dimension of the reduced-height waveguides 88A and 88B. In FIG. 3, the tee apertures 83A and 83B are positioned in opposite narrow walls of the reduced-height waveguides 88A and 88B so that electric field vectors can exit the apertures 83A and 83B and be arranged across the narrow dimension of the reduced-height waveguides 88A and 88B.

Yet another multiplexer embodiment 120 is shown in FIG. 5 which is similar to FIG. 3 with like elements indicated by like reference numbers. As in the embodiment 110 of FIG. 4, the tee 64A and the manifold 66 are arranged to form an E-plane junction 81. As in the embodiment 80 of FIG. 3, the tee's short-circuited end 82 is chamfered to facilitate multiple filter access to the tee 64A but the chamfering is along the tee's broad wall.

In the embodiment 120, two septums 84A and 84B divide the tee 64A into three reduced-height waveguides 88A, 88B and 88C. Three waveguide filters 62A, 62B and 62C are coupled through the short-circuited end 82 for respective access to the reduced-height waveguides 88A, 88B and 88C. To provide physical clearance between the filters, they are each coupled to the shorted end 82 through an evanescent aperture 122. The evanescent aperture is essentially a thick-walled aperture which is formed by a short waveguide whose cutoff frequency for harmonic higher-order modes is above the operating frequency of the embodiment 120. In contrast to the embodiments 80 and 110, the filters are arranged so that their electromagnetic fields couple out of a filter side wall and into the evansescent aperture 122.

Other embodiments of the invention may be configured with various waveguide members (e.g., rectangular or circular as shown by the broken line cross section 126 in FIG. 5), various junctions (e.g., E-plane or H-plane junctions) and various waveguide filter shapes (e.g., cylindrical, rectangular (as shown by the broken line 128 in FIG. 5) and spherical (as shown by the broken line 129 in FIG. 5) which realize various filter passbands (e.g., Chebyshev or quasi-elliptic). Although the filters 62 are coupled through narrow waveguide walls in FIGS. 3 and 5 and through broad waveguide walls in FIG. 4, other multiplexer embodiments can be formed that use a combination of these coupling arrangements.

In accordance with the invention, filters can be multiplexed through common tees to form efficient multiplexers/demultiplexers in a variety of microwave frequency bands (e.g., C band, Ku band or Ka band). For example, FIG. 6 shows a graph 130 of measured signal transmissions and reflections in a prototype of the multiplexer structure of FIG. 3. Plot 132 FIG. 6 shows reflection at the open-circuited end of the tee 64A (where it joins the manifold 66). Plots 134 and 136 of FIG. 6 show transmission respectively from inputs of the filters 62A and 62B to the open-circuited end of the tee 64A. As indicated, reflected signals were below −23 dB in the passbands of the filters and transmission loss in each passband was extremely low.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A multiplexer/demultiplexer, comprising:
   a primary waveguide;
   a secondary waveguide joined to said primary waveguide and providing first and second apertures for signal access to said secondary waveguide;
   a first waveguide filter coupled through said first aperture to said secondary waveguide;
   a second waveguide filter coupled through said second aperture to said secondary waveguide; and
   a septum positioned between said first and second apertures to provide signal isolation between said first and second apertures.

2. The multiplexer/demultiplexer of claim 1, wherein:
   said secondary waveguide has dimensions that allow propagation of signals which have an average guide wavelength $\lambda_{g_{avg}}$;
   said secondary waveguide has a short-circuited end; and
   said septum extends away from said short-circuited end by a distance greater than $(1/8)\lambda_{g_{avg}}$.

3. The multiplexer/demultiplexer of claim 1, wherein:
   said secondary waveguide has dimensions that allow propagation of signals which have an average guide wavelength $\lambda_{g_{avg}}$;
   said secondary waveguide has a short-circuited end; and
   said septum extends away from said short-circuited end by a distance substantially equal to $(1/4)\lambda_{g_{avg}}$.

4. The multiplexer/demultiplexer of claim 1, wherein:
   said septum divides a portion of said secondary waveguide into first and second subwaveguides; and
   each of said first and second apertures is positioned to provide access to a respective one of said first and second subwaveguides.

5. The multiplexer/demultiplexer of claim 1, wherein said primary waveguide and said secondary waveguide are rectangular waveguides.

6. The multiplexer/demultiplexer of claim 5, wherein said primary waveguide and said secondary waveguide are configured to define an E-plane junction.

7. The multiplexer/demultiplexer of claim 5, wherein said primary waveguide and said secondary waveguide are configured to define an H-plane junction.

8. The multiplexer/demultiplexer of claim 1, wherein said primary waveguide and said secondary waveguide are circular waveguides.

9. The multiplexer/demultiplexer of claim 1, wherein said first and second waveguide filters are cylindrical filters.

10. The multiplexer/demultiplexer of claim 1, wherein said first and second waveguide filters are rectangular filters.

11. The multiplexer/demultiplexer of claim 1, wherein said first and second waveguide filters are spherical filters.

12. The multiplexer/demultiplexer of claim 1, wherein said primary waveguide has a short-circuited end and said primary waveguide also has an open-circuited end which provides signal access to said secondary waveguide.

13. A spacecraft communication system, comprising:
   a spacecraft; and
   a transponder carried by said spacecraft, said transponder having:
   a) a receive antenna to receive input communication signals in a receive frequency band;
   b) a transmit antenna to radiate output communication signals in a transmit frequency band; and
   c) a frequency converter coupled between said receive antenna and said transmit antenna to convert said receive frequency band to said transmit frequency band, said frequency converter including:
      1) a demultiplexer for splitting said receive frequency band into a plurality of subbands;
      2) a plurality of amplifiers, each coupled to amplify input communication signals in a respective one of said subbands; and
      3) a multiplexer for combining said subbands into said transmit frequency band wherein said demultiplexer and said multiplexer each include:
         a) a primary waveguide;
         b) a secondary waveguide joined to said primary waveguide and providing first and second apertures for signal access to said secondary waveguide;
         c) a first waveguide filter coupled through said first aperture to said secondary waveguide;
         d) a second waveguide filter coupled through said second aperture to said secondary waveguide; and
         e) a septum positioned between said first and second apertures to provide signal isolation between said first and second apertures.

14. The communication system of claim 13, wherein in each of said mulitplexer and said demulitplexer:
   said secondary waveguide has dimensions that allow propagation of signals which have an average guide wavelength $\lambda_{g_{avg}}$;
   said secondary waveguide has a short-circuited end; and
   said septum extends away from said short-circuited end by a distance greater than $(1/8)\lambda_{g_{avg}}$.

15. The communication system of claim 13, wherein in each of said mulitplexer and said demulitplexer:
   said secondary waveguide has dimensions that allow propagation of signals which have an average guide wavelength $\lambda_{g_{avg}}$;
   said secondary waveguide has a short-circuited end; and
   said septum extends away from said short-circuited end by a distance substantially equal to $(1/4)\lambda_{g_{avg}}$.

16. The communication system of claim 13, wherein in each of said mulitplexer and said demulitplexer:
   said septum divides a portion of said secondary waveguide into first and second subwaveguides; and
   each of said first and second apertures is positioned to provide access to a respective one of said first and second subwaveguides.

17. The communication system of claim 13, wherein, in each of said mulitplexer and said demulitplexer, said primary waveguide and said secondary waveguide are configured to define an E-plane junction.

18. The communication system of claim 13, wherein, in each of said mulitplexer and said demulitplexer, said primary waveguide and said secondary waveguide are configured to define an H-plane junction.

19. A transponder, comprising:

a receive antenna to receive input communication signals in a receive frequency band;

a transmit antenna to radiate output communication signals in a transmit frequency band; and a frequency converter coupled between said receive antenna and said transmit antenna to convert said receive frequency band to said transmit frequency band, said frequency converter including:
1) a demultiplexer for splitting said receive frequency band into a plurality of subbands;
2) a plurality of amplifiers, each coupled to amplify input communication signals in a respective one of said subbands; and
3) a multiplexer for combining said subbands into said transmit frequency band wherein said demultiplexer and said multiplexer each include:
   a) a primary waveguide;
   b) a secondary waveguide joined to said primary waveguide and providing first and second apertures for signal access to said secondary waveguide;
   c) a first waveguide filter coupled through said first aperture to said secondary waveguide;
   d) a second waveguide filter coupled through said second aperture to said secondary waveguide; and
   e) a septum positioned between said first and second apertures to provide signal isolation between said first and second apertures.

20. The transponder of claim 19, wherein, in each of said mulitplexer and said demulitplexer, said primary waveguide and said secondary waveguide are configured to define an E-plane junction.

21. The transponder of claim 19, wherein, in each of said mulitplexer and said demulitplexer, said primary waveguide and said secondary waveguide are configured to define an H-plane junction.

22. The transponder of claim 19, wherein in each of said mulitplexer and said demulitplexer:

said secondary waveguide has dimensions that allow propagation of signals which have an average guide wavelength $\lambda_{g_{avg}}$;

said secondary waveguide has a short-circuited end; and said septum extends away from said short-circuited end by a distance greater than $(1/8)\lambda_{g_{avg}}$.

23. The transponder of claim 19, wherein in each of said mulitplexer and said demulitplexer:

said secondary waveguide has dimensions that allow propagation of signals which have an average guide wavelength $\lambda_{g_{avg}}$;

said secondary waveguide has a short-circuited end; and said septum extends away from said short-circuited end by a distance substantially equal to $(1/4)\lambda_{g_{avg}}$.

24. The transponder of claim 19, wherein in each of said mulitplexer and said demulitplexer:

said septum divides a portion of said secondary waveguide into first and second subwaveguides; and each of said first and second apertures is positioned to provide access to a respective one of said first and second subwaveguides.

* * * * *